United States Patent

Tanaka

[11] 4,139,898
[45] Feb. 13, 1979

[54] MICROFILM SEARCHING READER

[75] Inventor: Atsuyuki Tanaka, Sakai, Japan

[73] Assignees: General Company Limited; Minolta Camera Co., Ltd., both of Osaka, Japan

[21] Appl. No.: 792,095

[22] Filed: Apr. 29, 1977

[30] Foreign Application Priority Data

May 14, 1976 [JP] Japan .................................. 51-54291

[51] Int. Cl. .............................................. G06f 13/06
[52] U.S. Cl. ................................... 364/900; 353/26 A
[58] Field of Search ... 364/900 MS File, 200 MS File; 353/26 A

[56] References Cited

U.S. PATENT DOCUMENTS

| | | | |
|---|---|---|---|
| 3,075,178 | 1/1963 | James | 364/900 |
| 3,612,676 | 10/1971 | Ooba et al. | 353/120 |
| 3,781,809 | 12/1973 | Murakoshi et al. | 364/900 |
| 3,868,645 | 2/1975 | Delplanque et al. | 353/26 A |
| 3,949,375 | 4/1976 | Ciarlo | 353/26 A |

*Primary Examiner*—Steven L. Stephan
*Attorney, Agent, or Firm*—Fitzpatrick, Cella, Harper & Scinto

[57] ABSTRACT

A microfilm searching reader is provided which is capable of searching and displaying a page, or pages, of microfilmed dictionary containing a word related with a character input. The reader includes an input unit provided with character keys for generating first signals related with the character keys and coded according to a predetermined standard, a microfilm accommodating pages of a dictionary, a display device for feeding the microfilm to display a frame thereof, a memory for storing catchwords coded according to the predetermined standard, a reading unit for identifying the frames by reading the coded catchwords to generate second signals representing the catchwords, and a comparing control circuit for comparing both signals to cause the display device to feed the microfilm until the second signal becomes smaller than the first signal. In this arrangement a frame corresponding to a character input will be searched and displayed on the display device.

6 Claims, 11 Drawing Figures

MICROFILM SEARCHING READER

BACKGROUND OF THE INVENTION

1. Field of the Invention

The present invention relates to a microfilm searching reader, or an electronic dictionary, comprising input means provided with character keys for receiving character input a microfilm incorporating the pages of a dictionary, means provided with a screen for projecting the image of the microfilm, and means for searching a frame of the microfilm in response to the character input to give an instruction to the projecting means, thereby enabling the searching and projection on the screen of a desired page of the dictionary containing a word related with the character input performed by the character keys.

2. Description of the Prior Art

In the prior art there has not been known such an electronic dictionary. There have been proposed, however, various devices utilizing a microfilm and searching an image containing desired information to perform a function similar to that of the electronic dictionary.

For example there has been proposed a device wherein a microfilmed dictionary is mounted on an electrically driven carrier and a film displaying key is actuated to drive the carrier until a page containing a desired word will visually be searched on the screen.

Also there has been known a device in which the table of contents or index of a dictionary is recorded in the first frame of a microfilm, by means of which the desired frame number is searched and utilized for the key input to the device.

These two devices, requiring a long period of time for searching or necessitating the two-step procedure, do not necessarily offer an advantage in comparison with the use of an ordinary dictionary.

Further, there has been known a system wherein the microfilmed images and the catchword memory containing catchwords for searching a desired image are both recorded on the same microfilm. Such a system, however, requires a space for the catchword memory on the microfilm and has a difficulty in the stable scanning of the catchword memory.

Further, U.S. Pat. No. 3,612,676 issued on Oct. 12, 1971 to Ooba et al. discloses a dictionary-reading device which utilizes separate media for the microfilm and for the catchword memory, but such a device requires a complicated and expensive mechanism as the catchwords are recorded on an optical medium and retrieved by 5-bit parallel read-out.

SUMMARY OF THE INVENTION

An object of the present invention is to provide a microfilm searching reader or an electronic dictionary, at a reduced cost, for retrieving an image including a desired word with a simple operation and a rapid response.

Another object of the present invention is to provide an electronic dictionary of a relatively simpler structure.

Still another object of the present invention is to provide an electronic dictionary provided with means for visually displaying the input characters.

The microfilm searching reader of the present invention is composed of means connected to the input means for coding the input characters according to a predetermined standard, first storage means connected with the coding means for sequentially storing the thus coded characters into its predetermined digital positions, memory means provided with at least one memory track memorizing catchword, or keyword, codes which are coded according to the predetermined standard and to be utilized for indexing the pages of the dictionary in cooperation with clock, means associated with the memory means for reading the clock and catchword codes, means connected with the reading means for counting the clock to thereby identify a page unit, means for counting page numbers in response to the identification of a page unit, second storage means connected with the reading means for sequentially storing the catchword codes thus read out, comparing means connected with the first and second storage means for comparing the contents thereof according to the predetermined standard, and means for instructing the projecting means to project a frame of the microfilm corresponding to a count involved in the page number counting means when the content of the second storage means is found in the comparison to be equal to or larger than that of the first storage means.

According to an aspect of the present invention, the page unit identifying means is composed of means for counting clock to thereby identify the digital positions of the catchword code, and means connected with the digital position identifying means for counting the positions of the catchword code, the second storage means being of a storage capacity corresponding to at least one digit position of a catchword code to temporarily store one digit of the catchword code readout in sequential order, the comparing means being composed of means connected with the first storage means and the position counting means for extracting one digit at a time of the content of the first storage means sequentially from the first position thereof according to the count in the position counting means, and means connected with the extracting means and the second storage means for comparing, digit by digit, the content thus extracted from the first storage means with that of the second storage means.

According to another aspect of the present invention, the microfilm searching reader is further provided with means connected with the extracting means, the position identifying means and the position counting means for visualizing dynamically the characters introduced by the input means, and means for supplying clock to thereby advance the position identifying means to provide dynamic display on the display means.

DESCRIPTION OF THE PREFERRED EMBODIMENT

Now the present invention will be explained in detail in the following description while referring to the accompanying drawings.

Figure 1:
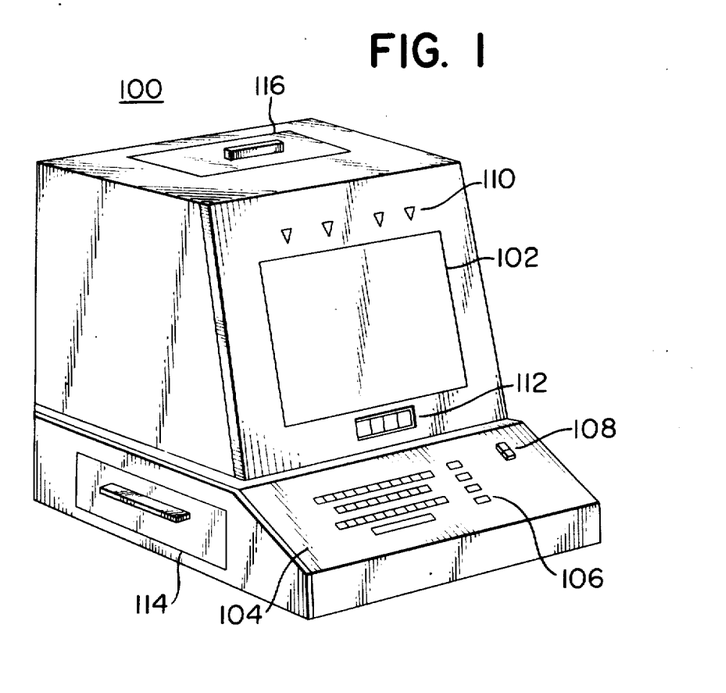
FIG. 1 is a perspective outer view of an embodiment of the electronic dictionary in accordance with the present invention.

Referring to FIG. 1 representing the outer view of a microfilm searching reader, or an electronic dictionary 100, according to the present invention, there are provided on the front side thereof a screen 102 for optical projection of a microfilm image, alphabetical keys 104 for the input of words to be retrieved, control keys 106 for performing searching functions, page indicator lamps 110 and a keyed-in data display 112, while there are also provided an opening 114 for inserting the catchword memory and an opening 116 for inserting the microfilm, respectively, on the side face and the top face thereof.

Figure 2:
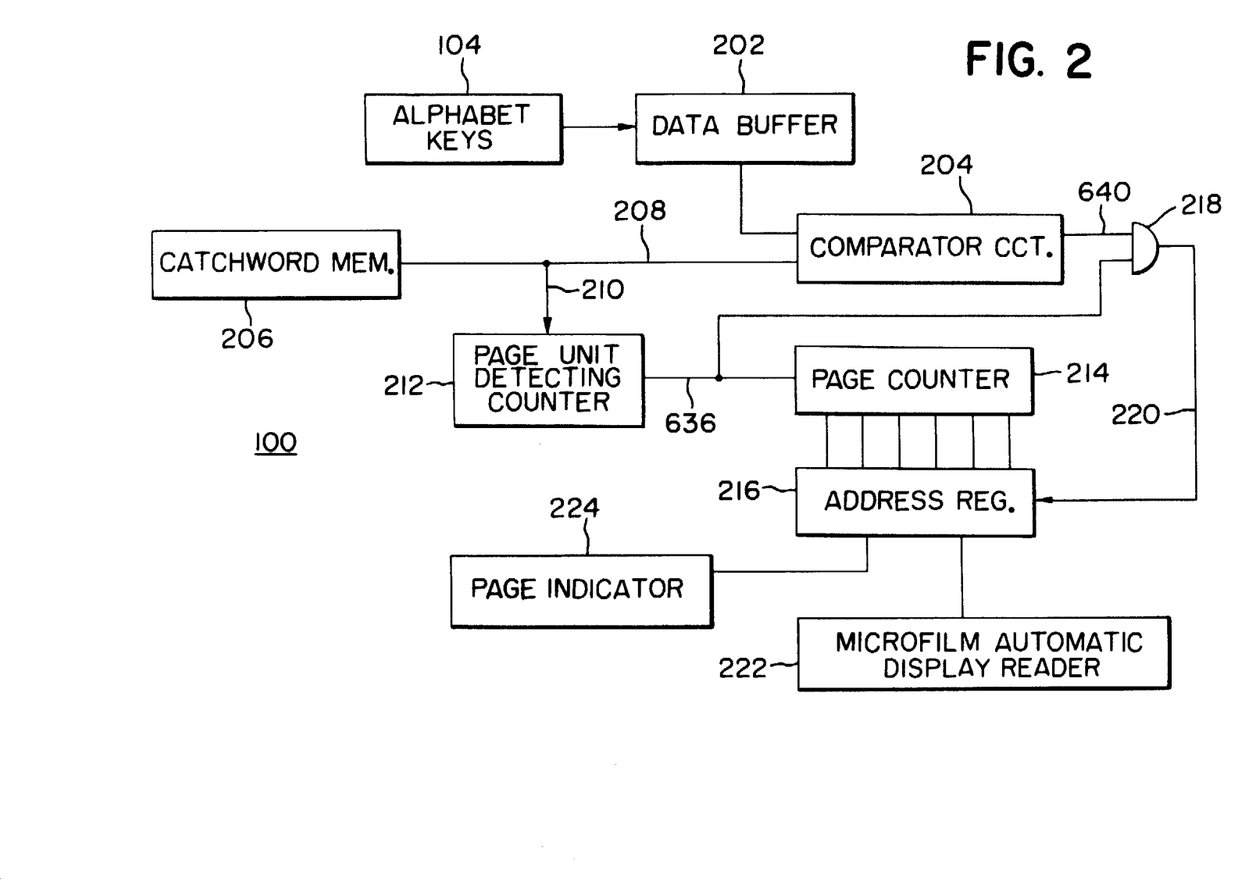
FIG. 2 is a functional block diagram of an embodiment of the electronic dictionary in accordance with the present invention.

Now referring to FIG. 2 representing the schematic composition of the electronic dictionary 100 of the present invention, the search keys 104 are composed of ordinary alphabetical or other phonetic characters, and can be composed of ordinary 26 alphabetical keys in an embodiment of application of the present apparatus to an English dictionary which will be described in the following. Search keys 104 are connected to a keyed-in data buffer 202 which is in turn connected to an input terminal of a comparing circuit 204.

Figure 3:
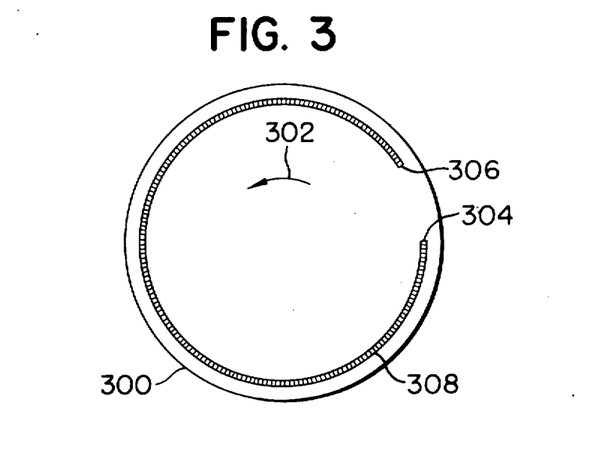
FIG. 3 is a plan view of a catchword memory to be employed in the electronic dictionary in accordance with the present invention.
Figure 4:
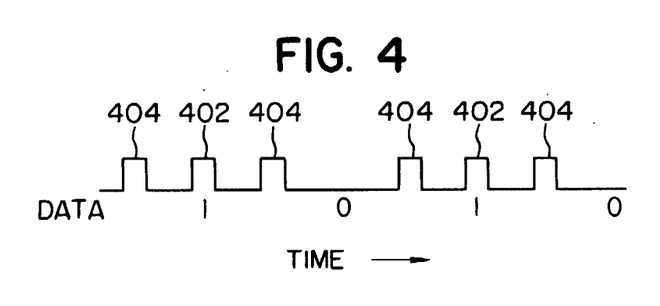
FIGS. 4 and 5 show the wave forms readout from the catchword memory in the electronic dictionary in accordance with the present invention.

The catchword memory 206 is a memory arrangement for memorizing catchwords, or keywords, each corresponding to the pages of a dictionary, and is composed, in the present embodiment, of a disc 300 on which are recorded binary codes representing the catchwords (see FIG. 3). Such recording can be performed either optically or magnetically. FIG. 3 is a plan view of such disc 300 which is rotatable in the direction of arrow 302 and on which the data are serially recorded from a read-out start position 304 to the end position 306. As shown in the read-out wave forms in FIG. 4, the data 402 are recorded with frequency modulation alternately with binary clock signals 404 on a track 308. FIG. 4 represents a case where the data are "1010".

Figure 5:
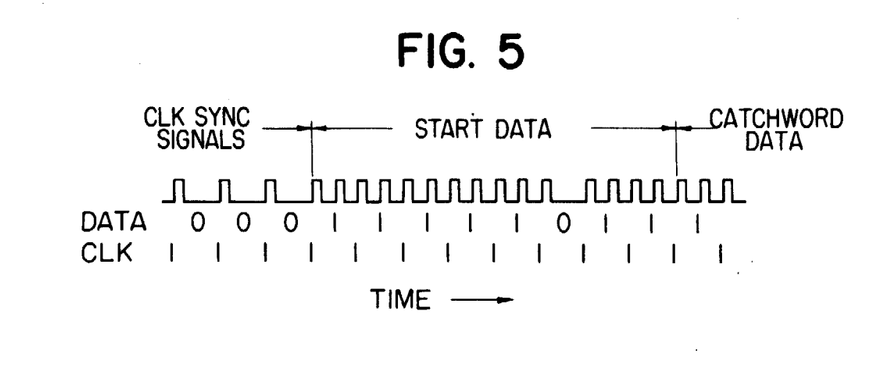

The track 308 of said catchword memory 206 contains, as shown in FIG. 5, a clock synchronizing signal portion, a start data portion and a catchword data portion. The clock synchronizing signal portion consists of all "0" signals which advantageously continue for a period of at least 20 data cycles or preferably 100 data cycles from the start position 304. The portion is utilized for synchronizing the data read-out in frequency modulation. As explained in the following, the end of data is identified by the detection of all "0" signals. The clock synchronizing signal portion is followed by a start data portion which includes the "1" signal and is composed of an 8-bit signal "11111011" indicating that the following signals are true signals.

The following catchword data portion is composed of alphabetical codes, a leading code and an ending code. As shown in Table I, each code is composed of 5 binary bits AK1, AK2, ..., AK5 wherein AK1 and AK5 respectively stand for LSB and MSB. In an application to an English dictionary as in the present embodiment, the catchword data are arranged in the alphabetical order, with so-called increasing significance from A toward Z. Similarly the bits in a code are arranged in the order of increasing significance, namely in the order of AK1, AK2, ..., AK5. This standard, or order, of arrangement is an important factor in the composition of the searching circuit as will be explained later.

Table I

|  | AK1(LSB) | AK2 | AK3 | AK4 | AK5(MSB) |
|---|---|---|---|---|---|
| Leading code | 1 | 0 | 0 | 0 | 0 |
| A | 0 | 1 | 0 | 0 | 0 |
| B | 1 | 1 | 0 | 0 | 0 |
| C | 0 | 0 | 1 | 0 | 0 |
| D | 1 | 0 | 1 | 0 | 0 |
| E | 0 | 1 | 1 | 0 | 0 |
| F | 1 | 1 | 1 | 0 | 0 |
| G | 0 | 0 | 0 | 1 | 0 |
| H | 1 | 0 | 0 | 1 | 0 |
| I | 0 | 1 | 0 | 1 | 0 |
| J | 1 | 1 | 0 | 1 | 0 |
| K | 0 | 0 | 1 | 1 | 0 |
| L | 1 | 0 | 1 | 1 | 0 |
| M | 0 | 1 | 1 | 1 | 0 |
| N | 1 | 1 | 1 | 1 | 0 |
| O | 0 | 0 | 0 | 0 | 1 |
| P | 1 | 0 | 0 | 0 | 1 |
| Q | 0 | 1 | 0 | 0 | 1 |
| R | 1 | 1 | 0 | 0 | 1 |
| S | 0 | 0 | 1 | 0 | 1 |
| T | 1 | 0 | 1 | 0 | 1 |
| U | 0 | 1 | 1 | 0 | 1 |
| V | 1 | 1 | 1 | 0 | 1 |
| W | 0 | 0 | 0 | 1 | 1 |
| X | 1 | 0 | 0 | 1 | 1 |
| Y | 0 | 1 | 0 | 1 | 1 |
| Z | 1 | 1 | 0 | 1 | 1 |
| Ending code | 0 | 0 | 1 | 1 | 1 |

In the present embodiment, the catchword indicating each page is composed of 4 alphabetical characters constituting the first four characters of a word appearing at the end of each page. For example, if a page ends with a word "dictionary", the catchword will be DICT, which, according to the Table I wherein:

D: 10100
I: 01010
C: 00100
T: 10101, will be recorded in the catchword data portion on the track 308 of the disc 300 in the form of binary code 10101 00100 01010 10100 in the order of increasing significance from its LSB to MSB. In this manner the catchword representing each page is composed of 20 binary bits extending from the LSB to MSB of the catchword. The arrangement in such an order enables to simplify the electronic dictionary, particularly the searching circuit thereof, as will be explained later.

Now, for the better understanding of the present invention, there will be given definitions of some terms to be employed in the following description. The word "frame" shall means an image frame of a microfilm, whereas the word "page" shall mean a page of a dictionary to be recorded in the frame. Thus one-to-one correspondence is not found between the frames and pages in case plural pages of a dictionary are to be recorded in a frame. The above-mentioned catchword is utilized for designating a page. In the present embodiment an English dictionary of 1024 pages is recorded in 256 frames each accommodating 4 pages. The catchword data therefore contains 20,480 bits in total.

Now returning to FIG. 2, the data of the catchword memory 206 of the above-mentioned composition are supplied through a line 208 to a comparing circuit 204, while the clock pulses are separated from said data and supplied through a line 210 to a page unit detecting counter 212 which is connected with a page counter 214 in turn connected with an address register 216 to allow parallel data transfer thereto. Address register 216 is biased with a preset signal generated by an AND gate 218 receiving the output signals of comparing circuit 204 and page unit counter 212, and transmitted through a lead 220. Address register 216 is further connected with an automatic microfilm display reader 222 and a page indicator 224, which includes page indicating lamps 110 and which can be dispensed with in case each frame contains only one page.

In the following there will be given an explanation on the function of the microfilm searching reader of the above-described composition.

Upon input of a word to be retrieved by means of search keys 104, the input data are temporarily stored in the keyed-in data buffer 202 and compared in comparing circuit 204 with the catchword data from the catchword memory 206. Simultaneously the clock signals from the catchword memory 206 are counted by the page unit detecting counter 212, and, upon identification of each page, the page counter 214 is advanced by one step. Since the catchwords are read in the order of increasing significance, the comparing circuit 204 releases a preset signal when the catchword data coincide with or exceed the keyed-in data, and the content of page counter 214 at that time is transferred to the address register 216. The automatic microfilm display reader 222 advances the microfilm to a frame of an address designated by address register 216, and projects the image of thus designated frame on the screen 102. Also the page indicator 224 indicates, by means of page indicating lamps 110, a page included in the frame projected according to the instruction of the address register 216. In this manner the retrieval of a page including the keyed-in word will be achieved.

Figures 6, 6A:
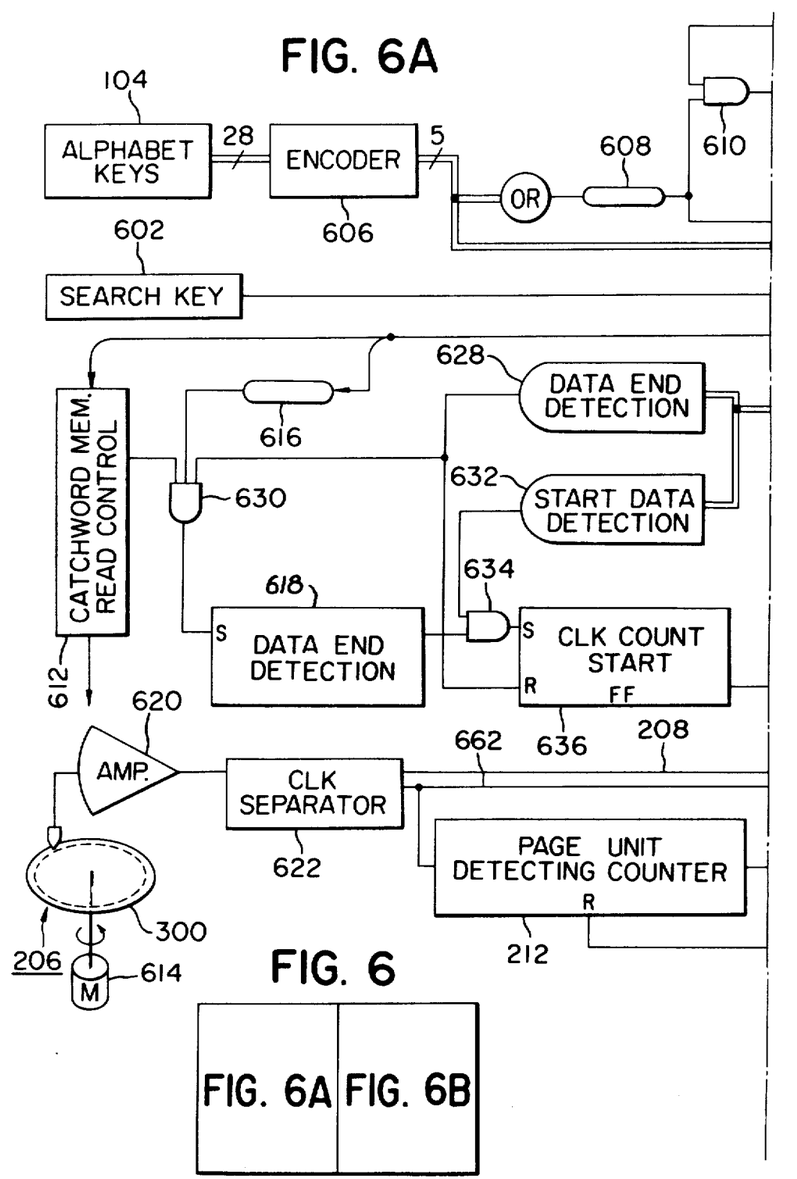
FIGS. 6A and 6B, when arranged as shown in FIG. 6, are functional block diagrams of the searching part of an embodiment of the electronic dictionary in accordance with the present invention.
Figure 6B:
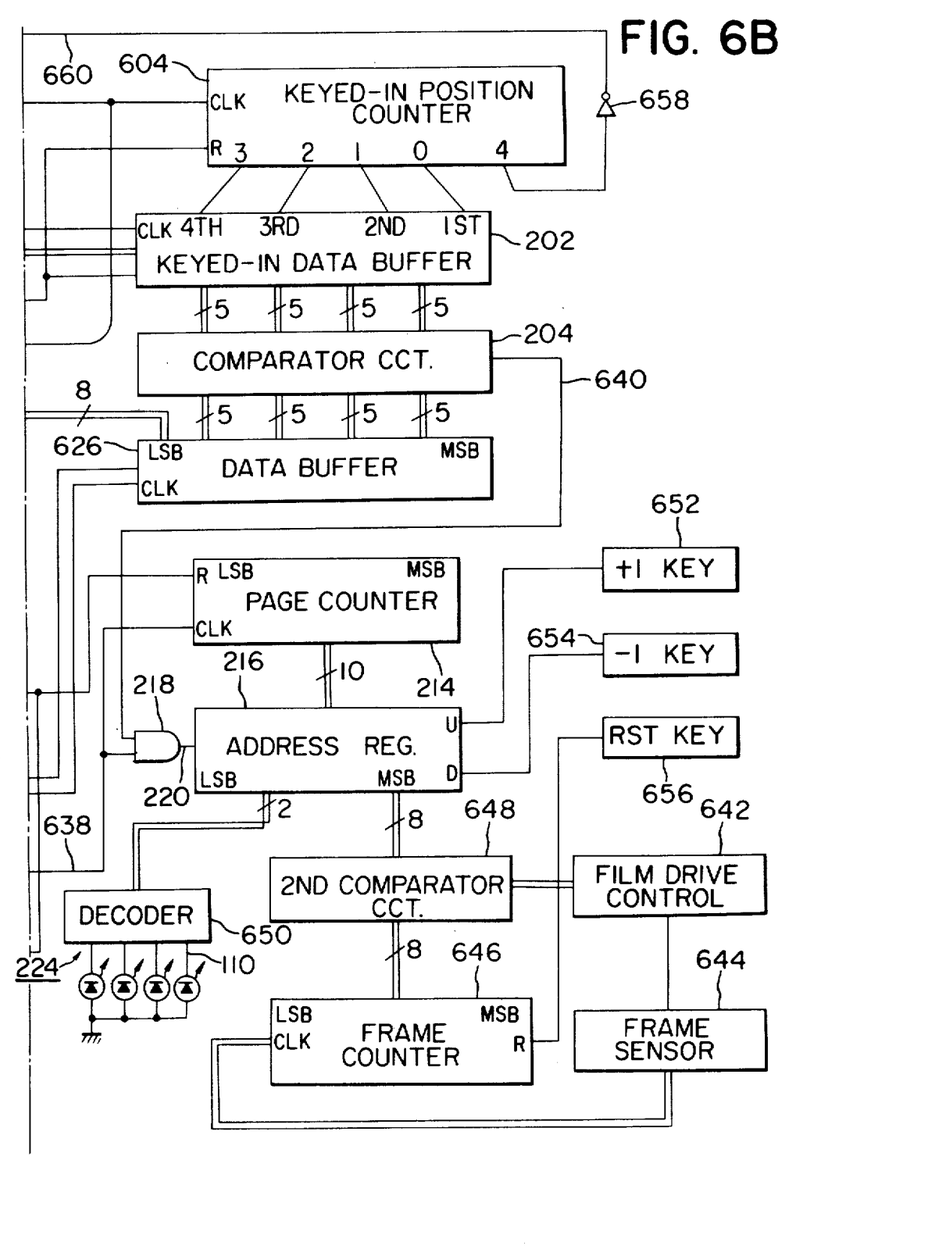

Now referring to FIG. 6 illustrating the catchword searching section of the present embodiment in accordance with the present invention, the double lines indicate parallel transfer buses of signals whereas single lines indicate serial transfer buses for signals or other control circuits. The numerals attached to the diagonal lines intersecting double lines indicate the number of bits of the parallel transfer buses. In the following there will be given a detailed explanation on an embodiment of the electronic dictionary according to the present invention, while making reference to FIG. 6.

Upon actuation of a search key 602 belonging to the control keys 106 of the electronic dictionary, there are cleared the keyed-in data buffer 202 and the keyed-in position counter 604. In the case of searching a word "diary" involved in the same page as "dictionary", a key "D" of the alphabet keys 104 is successively touched to cause the encoder 606 to generate a code "10100" corresponding to "D" as shown in Table I. Encoder 606 can be composed of an ordinary code generator. Simultaneously generated is one key clock pulse which, after elimination of the chattering and other noises by means of a chattering eliminating circuit 608, causes the code "10100" to be stored in the first position of the keyed-in data buffer 202. Keyed-in data buffer 202 can be composed of a group of flip-flops (FF) structured to memorize 4 character codes, or keyed-in data of 20 bits. The key clock pulse functions to enable an AND gate 610 thereby advancing the keyed-in position counter 604 by one step and gives an instruction to a catchword memory readout control 612 on the reading of catchword memory 206.

After a delay of approximately 0.1 seconds by means of a readout delay circuit 616 in order to stabilize the function of catchword memory drive 614 before starting the output of catchword data, and the data end is indicated in a data end detecting flip-flop 618.

As the signal read from the disc 300 of catchword memory 206 through an amplifier 620 serially contains clock pulses and data pulses as explained in the foregoing, these two signals are separated by a clock separating circuit 622. The data pulses thus separated are transferred serially through a line 208 to a date buffer 626 and stored therein. The data buffer can be composed of an ordinary shift register.

Data buffer 626 is connected to a data end detecting circuit 628 which can be composed of an ordinary gate circuit for identifying that the 8 bits are all "0". Since the readout data from the catchword memory 206 become all "0" only in the clock synchronizing signal portion, the data end is detected upon passing the start position 304 of the catchword memory 300 to release an output signal to an AND gate 630, which receives the outputs of the catchword memory readout control 612 and of the readout delay circuit 616 as well as the output of the data end detecting circuit 628 to set the data end detecting flip-flop 618.

Upon transfer of the start data portion ensuing the clock synchronizing signal portion from the catchword memory 300 to the data buffer 626 and storage therein, a start data detecting circuit 632 identifies a pattern "111110111" to set a clock count starting flip-flop 636 through an AND gate 634. Start data detecting circuit 632 can be composed in a similar manner as the data end detecting circuit 628. The setting of clock count starting flip-flop 636 cancels the reset signal on the line 624 to release the page counter 214 and the page unit detecting counter 212 from the reset state thereof and to thus initiate the counting operation of the clock pulses 404 from the catchword memory 300.

A catchword in the present embodiment consists of 4 digits each containing 5 bits (Table I), namely 20 bits in total. Consequently one page can be identified by counting 20 clock pulses 404 from the catchword memory 300. Thus the page unit detecting counter 212 is a binary counter capable of releasing an output signal to the line 638 upon counting of 20 pulses.

The page counter 214 is so structured as to count the output signal for each page appearing on the line 638 and to count and identify all the pages of the dictionary. In the present embodiment it is composed of a binary counter of 10 digits for enabling counting up to 1024 pages.

As explained in the foregoing, the catchword data are read from the catchword memory 300 in the order of increasing significance starting from a catchword representing the first page immediately after the start data portion, and sequentially stored in the data buffer 626. Thus, at the moment of supply of an output signal to the line 638 from the page unit detecting counter 212 upon counting 20 clock pulses 404, namely at the moment of generation of a page unit clock pulse, a catchword code of 20 bits corresponding to such a page is correctly stored from the LSB to MSB of the data buffer 626.

The comparing circuit 204 performs the comparison of the keyed-in data involved in the keyed-in data buffer 202 with the catchword data stored in the data buffer 626. The catchword data serially read from the catchword memory 300 are stored in the data buffer 626 in the order of increasing significance, or in the increasing order of binary numbers. This comparing circuit 204 is so structured as to release an output signal to a line 640 when the catchword data become equal to or larger than the keyed-in data. In the present example wherein the keyed-in character is "D", the content of the keyed-in data buffer 202 is 00000 00000 00000 10100;

and the comparing circuit 204 releases an output or comparison signal to the line 640 when the content of data buffer 626 becomes equal to or larger than xxxxx xxxxx xxxxx 10100;

where "x" represents a "don't care" bit.

The comparison signal opens the AND gate 218 to release a signal on a line 220 thereby allowing the address register 216 to receive a number designating the address of the page from the page counter 214.

The content of the address counter 216 designates the frame number of the microfilm by the upper 8 bits and the page included in the frame (4 pages in a frame in the present example) by the lower 2 bits.

The feeding of microfilm, which is of a roll form in the present embodiment, is controlled by a film drive control circuit 642. The film feeding causes a frame advancement detecting circuit 644 to release pulse signals which are counted by a frame counter 646 of which the content corresponds to the present frame number. A second comparing circuit 648 compares the present frame number contained in the frame counter 646 with the microfilm frame address contained in the upper 8 bits of the address counter 216 to supply a film feed signal to the film drive control circuit 642 if the content of the frame counter is smaller than that of the address counter. Consequently the film feeding is continued until the content of register 216 becomes identical with that of counter 646, and a projection is performed on the screen 102 of a frame designated by the address counter 216 when the contents coincide with each other. The details of these circuits are omitted here as they have no direct relationship with the understanding of the present invention.

Upon succeeding input of "I" by a key 104, a code "01010" corresponding to "I" will be stored in the second digit of the keyed-in data buffer 202 in a fashion similar to the case of "D" input. Thus the keyed-in data buffer becomes to have a content:

00000 00000 01010 10100.

The function of reading catchword data from the catchword memory 300 to the data buffer 626 is still in continuation, with the counting of clock pulses 404 by the page unit detecting counter 212 and with the advancement of page counter 214. Thus, when the content of the data buffer becomes equal to or larger than xxxx xxxx 01010 10100, the comparing circuit 204 causes the content of page counter 214 to be transferred to the address register 216 and the microfilm to be advance to a frame number designated by address register 216.

Upon further input of the characters "A" and "R" by means of keys 104, the foregoing operations are repeated to bring the content of the keyed-in data buffer 202 to:

11001 01000 01010 10100.

If the word "diary" is contained in a same page as "dictionary" which is identified by a catchword "DICT", the advancement of the microfilm is stopped at a frame including a page designated by the catchword "DICT", since the keyed-in data is smaller as a binary number than the catchword data when the catchword DICT is transferred from the catchword memory 300 to the data buffer 626 in a binary number form:

10101 00100 01010 10100.

At this moment the lower two digits of the address register 216 indicate the desired page number in the frame, which is decoded in a decoder 650 to light either one of the page indicating lamps 110. For this purpose an ordinary decoder for converting 2-digit binary code into a one-out-of-four code can be used, and lamps 110 can be replaced by light emitting diodes or other similar devices.

The content of address register 216 may be increased or decreased by one step by means of actuating a "+1" key 652 or a "−1" key 654 in the control keys 106. In this manner the address register 216 also performs the function of an up-down counter and thus enables manual change of the page addressing before and after the searched page. In the present embodiment wherein the keyed-in data buffer 202 is provided with a capacity of 4 digits, the signal on the line 660 is cancelled through an inverter 658 and the catchword memory readout control 612 is likewise closed upon counting by the keyed-in position counter 604 of five key clock signals from the encoder 604, even if a whole word "diary" is introduced. Stated differently the searching is always performed with the first four digits, i.e., "DIAR", while the fifth digit or any ensuing digits are meaningless even if they are present in the character input. The above-mentioned keys 652 and 654 are provided in order to cope with the necessity arising from such limitation.

Although the present apparatus is structured to be automatically reset to an initial state upon closing the power switch, for safety there is provided a reset key 656 in the control keys 106, which fully rewinds the microfilm and returns the frame counter 646 to the state of all "0". In this manner the correspondence between a frame number and the content of frame counter 646 is assured.

Upon completion of the above-mentioned procedure, a search for another word may be conducted by depressing the search key 602 and repeating the above-described procedure.

Figures 7, 7B:
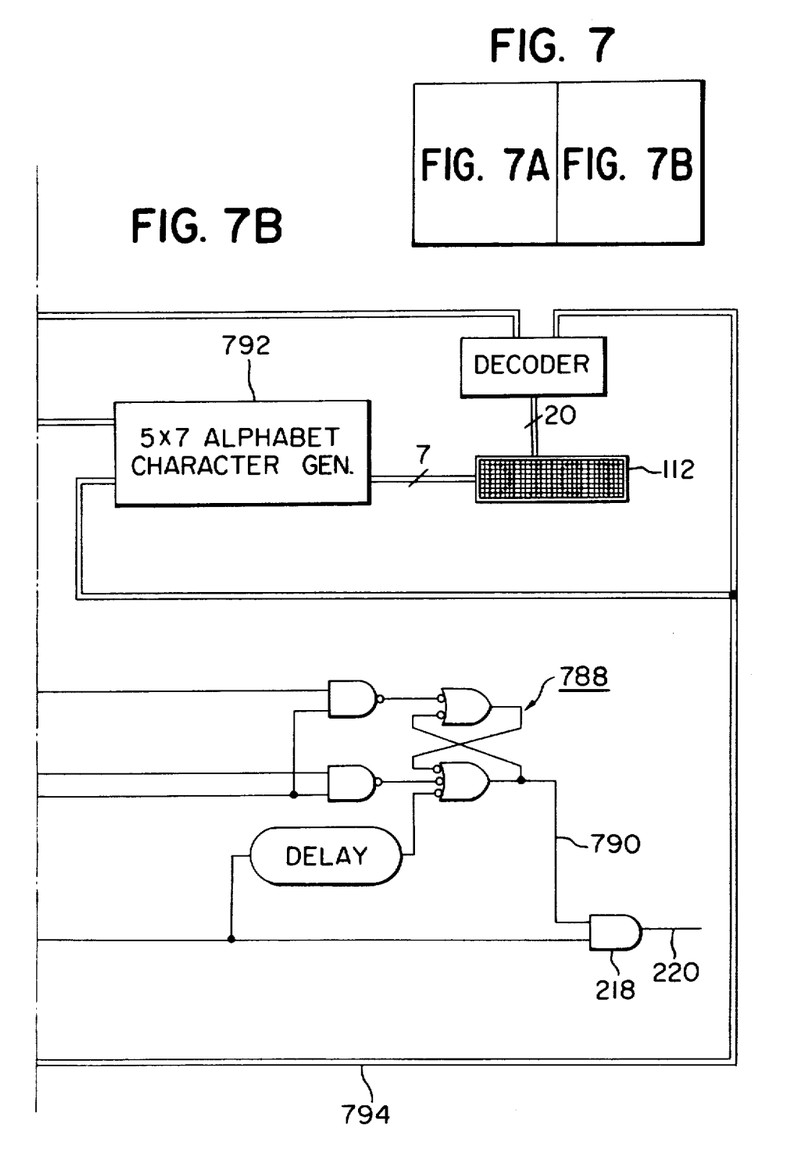
FIGS. 7A and 7B, when arranged as shown in FIG. 7, are functional block diagrams of the searching part of another embodiment of the electronic dictionary in accordance with the present invention.
Figure 7A:
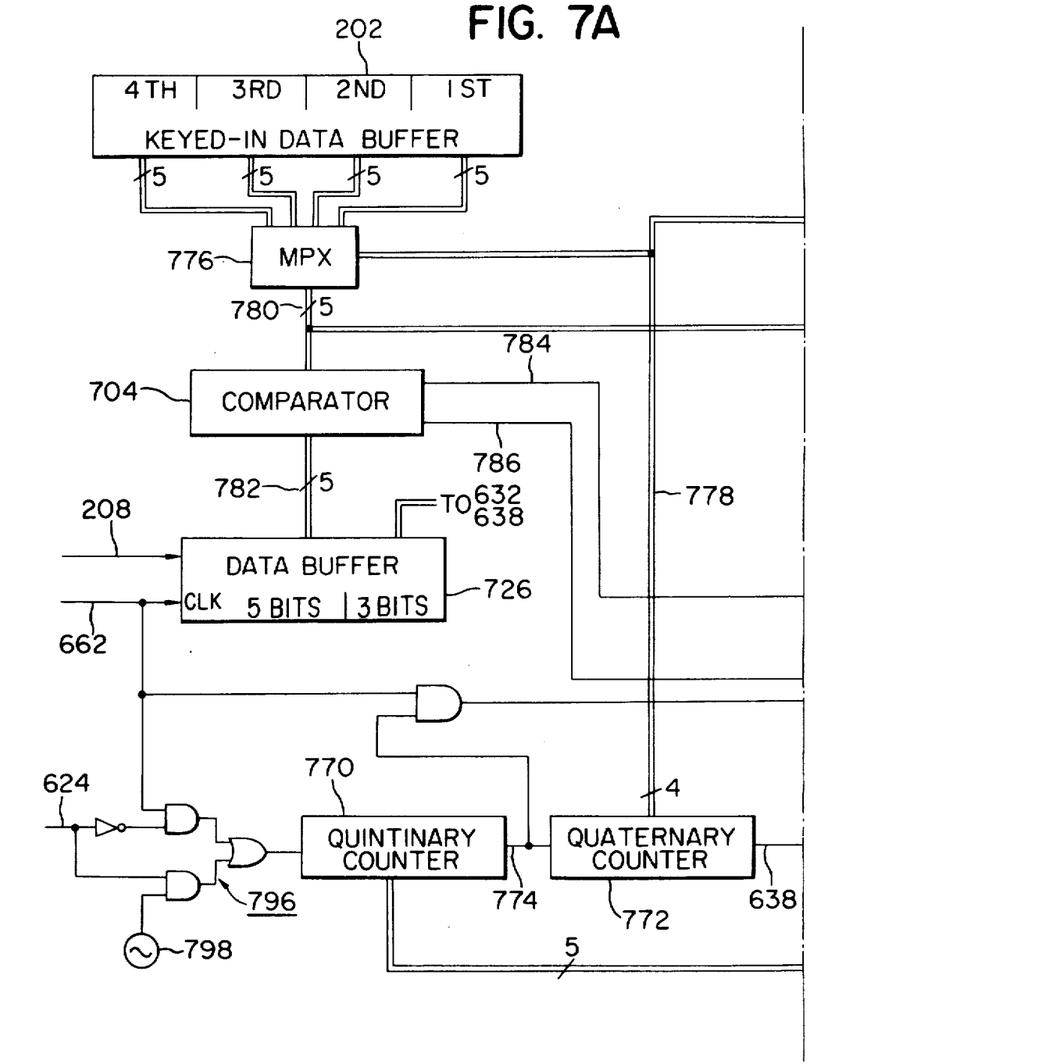

In a second embodiment of the electronic dictionary of the present invention illustrated in FIG. 7, wherein the same elements as in FIG. 6 are represented by the same numerals the data buffer is featured by a 5-bit structure whereas the corresponding buffer 626 in FIG. 6 is composed of 20 bits. The start data portion consisting of an 8-bit pattern "11111011" is transferred to a data buffer 726 and is detected by the start data detecting circuit 632 (FIG. 6). For this purpose data buffer 726 is required to have a capacity of 8 bits. Upon detection of the start data, a quinary counter 770 and a quaternary counter 772 in FIG. 7 are activated through the line 624 for counting the clock signals 404 supplied through the line 662. Quinary counter 770 is to identify each digit of a 5-bit code of each catchword data, and releases a position clock signal to a line 774 upon reception of five clock signals from the catchword memory 300. Also quaternary counter 772 counts the position clock signals and identifies the reception by the data buffer 726 of four catchword data codes, or, one word (20 bits) composed of the catchword data. In this manner counters 770 and 772 correspond, in combination, to the page unit detecting counter 212 in FIG. 6.

Simultaneously a multiplexer 776 selects, according to the instruction transmitted from quaternary counter 772 and through a line 778, the keyed-in data in the keyed-in data buffer 202 sequentially from the first digit to the fourth digit thereof, and releases the data to a line 780. Upon generation of a position clock signal, a comparator 704 compares the content A of a position of the keyed-in data appearing at an input terminal 780 of the comparator with the content B of corresponding 5-bit position in the 8 bits of data buffer 726, and the result of such comparison is supplied to the output lines 784 and 786 according to the following Table II.

Table II

|       | line 784 | line 786 |
|-------|----------|----------|
| A < B | 1        | 0        |
| A = B | 0        | 0        |
| A > B | 0        | 1        |

A digit magnitude decision flip-flop 788 is initially preset so that the output line 790 thereof is in its "1" state. Upon comparison of the first digit, and if A<B, the line 790 is shifted to the "0" state while, if A>B or A=B, it retains the "1" state. Such comparison is sequentially repeated to the 4th digit to provide the result of comparison to the line 790. In this manner a preset signal similar to that in the embodiment of FIG. 6 can be obtained on the line 220.

The above-mentioned structure, allowing the number of circuit elements required for the data buffer 726 and for the comparator 704, is particularly advantageous since the cost of the apparatus is not significantly affected by the number of digits of catchword representing a page.

In the embodiment of FIG. 7 there is provided a keyed-in data indicator 112 wherein each digit of keyed-in data transmitted through multiplexer 776 and line 780 is converted into a 5 × 7-dot matrix by means of an alphabetical character generator 792 and displayed by light emitting diodes (LED's) 112. In the present example a dynamic display is achieved by means of LED's TIL305 of the Texas Instruments. In such composition, since the bit number of each digit of the keyed-in data and the number of columns of the 5 × 7-dot matrix are both equal to 5, it is made possible to connect the output of quintinary counter 770 of the page unit detecting counter to character generator 792 through a line 794 and to utilize the output as a column address for indicator 112. The character generator can be composed for example of Signetics 2516 or TMS4103 of the Texas Instruments Incorporated.

Since the read-out of the catchword data from the catchword memory 300 is limited to a very short period in the searching step, a dynamic (time sharing) drive of the indicator 112 is achieved by switching the page unit detecting counters 770 and 772 by means of a gate group 796 during the non-use periods and connecting an indicating oscillator 798 to the counters. Indicating oscillator 798 may be composed of an astable multivibrator of a frequency of approximately 10 KHz.

Owing to the composition detailedly explained in the foregoing, the electronic dictionary in accordance with the present invention is featured in a simple operation allowing the search of the desired page by introducing initial four characters of the word to be searched by means of the alphabetical keys, simple circuitry allowing the search of a desired frame of the microfilm due to serial arrangement of catchword codes which are arranged in the order of increasing significance with respect to the arrangement of character codes as well as that of digits therein in the catchword memory, a simplified circuit configuration of the comparator and the data buffer due to the use of the multiplexer on the keyed-in data stored in the keyed-in data buffer, and further a simplified circuit configuration in the visual display of keyed-in data by effectively utilizing the non-use period of the multiplexer, quintinary counter and quaternary counter through the use of the bits of each digit of the keyed-in data common in number to the columns of the dot matrix of the keyed-in data indicator. Thus the present invention advantageously provides an inexpensive electronic dictionary with simple operation and circuitry.

It is to be understood that the skilled in the art may introduce any modifications or variations within the spirit and scope of the present invention, for example the use of a separate track for the exclusive recording of clock signals on the disc for catchword memory.

What I claim is:

1. A microfilm searching reader for searching a microfilm having pages of a dictionary recorded in frames in a predetermined order for a frame containing a word associated with an input character to display the frame on a display unit comprising:

input signal generating means provided with character keys entering input characters into the reader for generating first signals encoded according to a coding standard in response to the character keys, the coding standard providing each of the characters with a unique significance which increases along the predetermined order;

memory means including at least one memory track having catchwords recorded thereon in combination with clock signals, said catchwords being associated with respective pages of the dictionary, each of the catchwords being encoded according to the coding standard and aligned in accordance with the predetermined order;

reading means for sequentially reading said clock signals together with the catchwords to develop second signals representative of the catchwords;

page identifying means including page counting means for counting the number of pages in response to detection of a page unit, said page identifying means being connecting to said reading means for identifying pages of the dictionary associated with the catchwords from the second signals to produce third signals representative of the number of pages of the dictionary, said page identifying means comprising page unit detecting means connected to said reading means for counting the clock signals to detect a page unit of the dictionary;

said page unit detecting means comprising means connected to said reading means for detecting a digit position of the second signals, and means for counting the number of digit positions of the second signals in response to said digit position detecting means;

comparing means connected to said input signal generating means and said reading means for comparing the second signals with the first signals for determining when the second signals are equal to or exceed the first signal with respect to the significance to develop a fourth signal;

said comparing means comprising first storage means connected to said input signal generating means for storing the first signals sequentially in predetermined digit positions, second storage means connected to said reading means for storing the second signals therein, said second storage means having a storage capacity of at least one digit of the second signals and temporarily storing one digit in succession of the second signals, means connected to said first storage means and said digit position number counting means for extracting digit by digit the first signals from said first storage means in response to the number counted in said digit position number counting means, and comparator means connected to said extracting means and said second storage means for comparing the second signals with the first signals digit by digit to develop the fourth signal; and display control means connected to receive the third signal produced from said page identifying means during the fourth signal for producing control signals which permit the microfilm to be fed until the display unit displays the frame containing the page represented by the third signal received.

2. A microfilm searching reader according to claim 1, wherein the coded catchwords recorded in said memory means are preceded by a clock synchronizing signal for achieving clock synchronization and a start data code containing a predetermined bit pattern of at least one bit following the clock synchronization signal, said page identifying means further comprising means connected to said second storage means for identifying the predetermined bit pattern to activate said page unit detecting means and said page counting means.

3. A microfilm searching reader according to claim 2, wherein the storage capacity of said second storage means is equal in bit length to the bits involved in the predetermined bit pattern.

4. A microfilm searching reader according to claim 1, further comprising means connected to said first storage means for visualizing the first signals stored in said first storage means.

5. A microfilm searching reader according to claim 4, wherein said visualizing means comprises a dot matrix display device which has columns equal in number to bits contained in one input character of the first signals.

6. A microfilm searching reader according to claim 4, wherein said visualizing means comprises means for supplying clocks to said digit position detecting means to advance said digit position detecting means, and means connected to said extracting means, said digit position detecting means and said page unit detecting means for dynamically displaying the first signals stored in said first storage means in synchronism with the clocks supplied from said clock supplying means.

* * * * *

UNITED STATES PATENT AND TRADEMARK OFFICE
CERTIFICATE OF CORRECTION

PATENT NO. : 4,139,898
DATED : February 13, 1979
INVENTOR(S) : ATSUYUKI TANAKA

It is certified that error appears in the above-identified patent and that said Letters Patent are hereby corrected as shown below:

Column 4, line 53, change "means" to --mean--.

Column 7, line 56, change "advance" to --advanced--.

Column 10, line 44, in Claim 1, change "connecting" to --connected--.

Signed and Sealed this

Eleventh Day of September 1979

[SEAL]

Attest:

LUTRELLE F. PARKER
*Attesting Officer*     *Acting Commissioner of Patents and Trademarks*